May 30, 1950

A. A. BRITAIN ET AL 2,509,720

DYNAMOELECTRIC MACHINE CAST WINDING
ROTOR AND METHOD OF MAKING

Filed July 31, 1946

2 Sheets-Sheet 1

Inventors:
Aubrey A. Britain,
Robert L. Strode, Jr,
by Prowell & Mack
Their Attorney

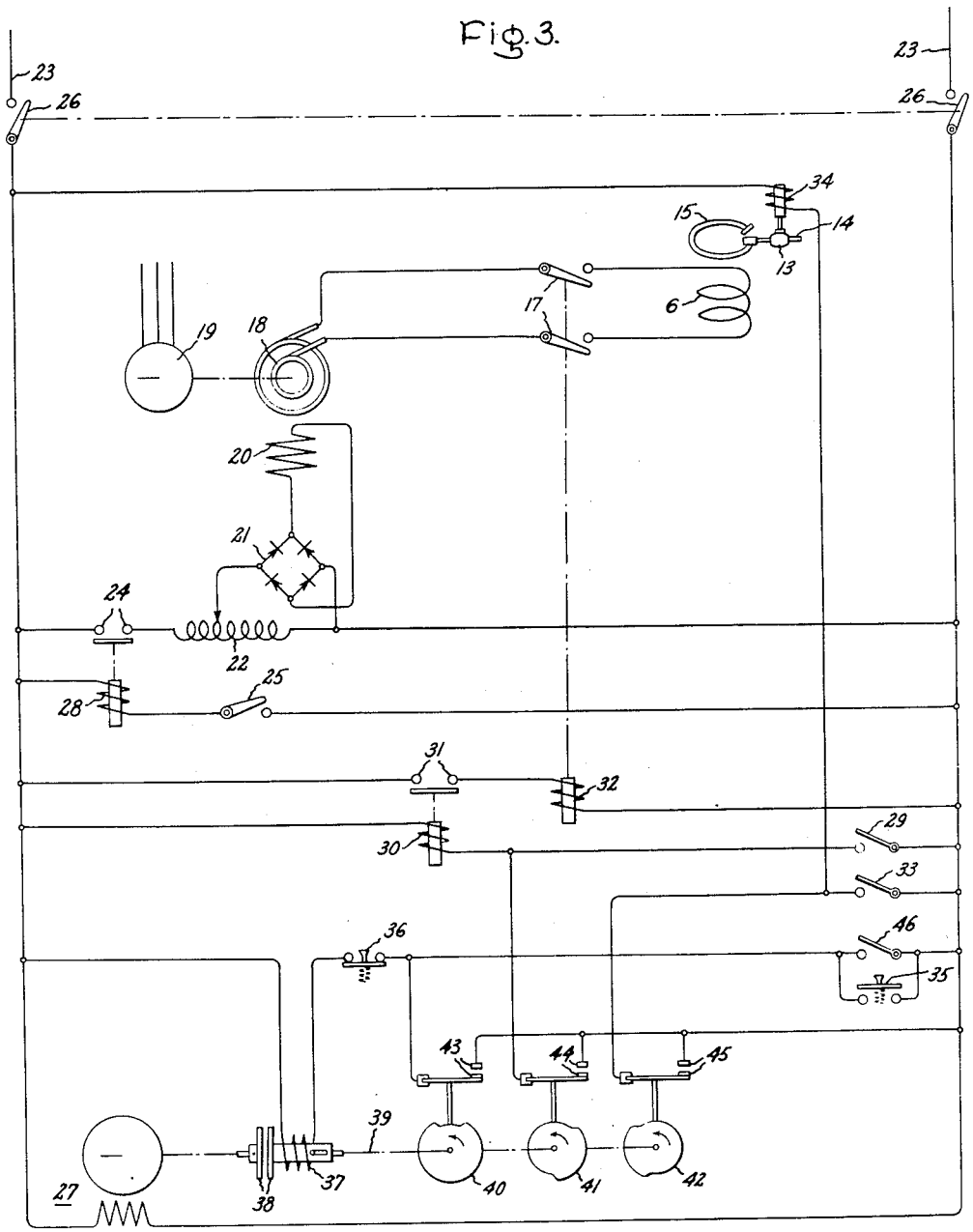

Patented May 30, 1950

2,509,720

UNITED STATES PATENT OFFICE 2,509,720

DYNAMOELECTRIC MACHINE CAST WINDING ROTOR AND METHOD OF MAKING

Aubrey A. Britain and Robert L. Strode, Jr., Marblehead, Mass., assignors to General Electric Company, a corporation of New York Application July 31, 1946, Serial No. 687,440

6 Claims. (Cl. 172—120)

Our invention relates to improved dynamoelectric machine members and an improved system and method for making the same, and is particularly directed to improvements in dynamoelectric machine members having cast windings therein.

In the manufacture of dynamoelectric machines which are provided with cast windings, such as induction motor squirrel cage rotatable members, various arrangements have been proposed for providing suitable insulation between the cast squirrel cage winding and the laminated core of the member without the production of any appreciable loss in space due to this insulation. However, in most instances, it has been found very difficult to eliminate the short circuiting of the laminations of the core by aluminum or other metal which forms the cast winding, as these members usually are ground or turned down after the casting operation, and this finishing procedure tends to smear the metal of the winding into intimate electrical contact with the bare outer surface metal of the laminations and also to embed some of the winding metal in the space between the laminations, thereby forming a good electrical contact with adjacent laminations through the winding and this smeared metal.

An object of our invention is to provide an improved dynamoelectric machine member having a cast winding therein.

Another object of our invention is to provide an improved system for making dynamoelectric machine members having cast squirrel cage windings therein.

A further object of our invention is to provide an improved equipment for the manufacture of dynamoelectric machine members having cast squirrel cage windings in such members.

A still further object of our invention is to provide an improved method of treating dynamoelectric machine members having cast windings therein to provide an improvement in the efficiency of such dynamoelectric machine members.

Further objects and advantages of our invention will become apparent and our invention will be better understood from the following description referring to the accompanying drawing, and the features of novelty which characterize our invention will be pointed out with particularity in the claims annexed to and forming part of this specification.

Figure 1:
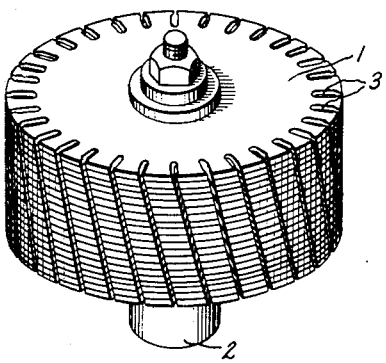
Figure 2:
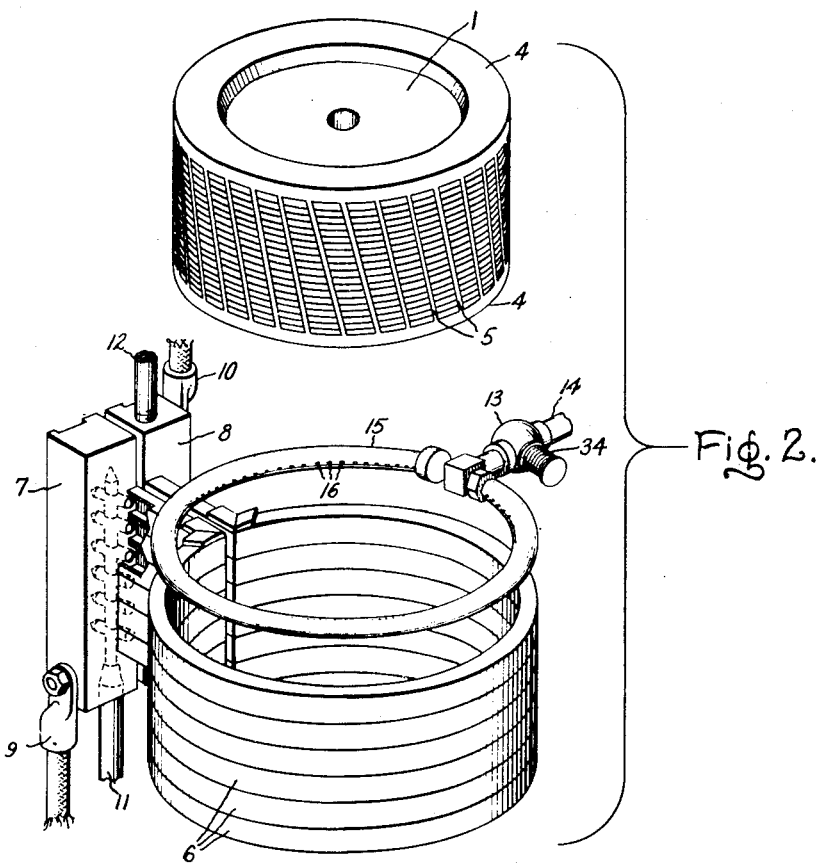

In the drawing, Fig. 1 is a perspective view of an assembled laminated core which may be used in carrying out our invention; Fig. 2 is a perspective view illustrating the main parts of the treating equipment and a completed dynamoelectric machine rotor with a cast squirrel cage winding therein to which our improved treatment may be applied; and Fig. 3 is a schematic diagram of a system for carrying out one embodiment of our improved method of making dynamoelectric machine members.

Referring to the drawing, we have illustrated our invention in connection with a cast squirrel cage induction motor rotor member which, as shown in Fig. 1, is provided with a core 1 formed of a plurality of circular laminations of magnetic material which may be assembled on an arbor 2 prior to the casting of a winding in axially extending winding slots 3 formed in an edge of the core. In order to improve the efficiency of the machine by minimizing the electrical contact between the cast squirrel cage winding and the core 1, it is desirable that the cast winding should be insulated from the core 1, and in order to utilize the material to its best advantage, this insulation should be made as small as possible. In some instances, it has been found that when the cast squirrel cage winding is formed of aluminum, a part of our improved treatment provides adequate insulation between the winding and the laminations of the core for most purposes. However, in order to obtain the best results, our improved treatment includes the provision of a thin insulating coating between the cast squirrel cage winding and the laminated core 1 even with the use of aluminum as the metal forming the cast winding. Aluminum oxide on the surface of a cast aluminum winding forms very easily and thereby inherently provides a certain amount of insulation between the cast winding and the laminated core. However, the efficiency of the dynamoelectric machine rotor can be further improved by applying a thin clay wash to the surface of the winding slots 3 and the outer surface of the outer laminations of the core 1. This can best be applied after assembling the circular laminations as shown in Fig. 1 and dipping the assembled core into a thin clay and water mixture, such that a thin coating is applied to all of the exposed surfaces of the assembled laminations. This coated core is then thoroughly dried in any suitable manner, as by air drying or by baking in a suitable oven, after which the winding is cast into the slots and end rings 4 are formed on each end of the rotor electrically connecting together conductors 5 in the slots 3, thus providing a finished rotor with a squirrel cage winding, as shown in Fig. 2.

In most instances, the circular or annular laminations of the core 1 are initially made slightly larger than the desired finished diameter, and after the casting operation, the member is finished by turning, and in some instances grinding, to the desired dimension. This finishing operation usually tends to smear some of the cast metal of the winding into very intimate electrical contact with the peripheral edge of the laminated core 1, thereby effectively short circuiting the various laminations of this core and producing undesirable core losses under normal running conditions. In order to improve the efficiency of the dynamoelectric machine, it is desirable that the core losses should be eliminated or at least minimized. In the illustrated embodiment of our improved dynamoelectric machine member, these losses are very greatly reduced by inductively heating the dynamoelectric machine member by high frequency to a temperature slightly below the melting point of the metal of the cast winding for a few seconds and then quickly subjecting the member to a quick cooling, as by quenching, until it reaches about ambient temperature. It has been found that this very intense heat for a brief period of time can best be obtained by induction heating at a high frequency which may be any frequency within a wide range which, for example, might range from about 3,000 cycles per second to 500,000 cycles per second. We have found that substantially 9600 cycles per second provides very good results. The power consumption depends on the physical characteristics of the winding and core. In the case of aluminum the winding is heated to about 525–640° C. for about 1–50 seconds after the winding reaches this temperature. We have found that our improved dynamoelectric machine member which is treated in this manner possesses the properties and characteristics which indicate by the reduced core losses of the member that the electrical connections of the winding to the core have been effectively eliminated or minimized. It is not exactly certain what principal feature characterizes the properties of a dynamoelectric machine member made in this manner. However, it appears that under the very intense heat to which the winding is subjected for a brief space of time, the metal which may have been smeared over the surface of the laminated core, and even the metal of the winding conductors which may have become embedded between the laminations in the slots of the core, expands, and then due to the rapid quenching it contracts quickly to draw back the metal into the slots and seems to break the close bond between the winding material and the laminations, particularly the close bond which is artificially created in the machining of the member to its finished dimension, and the winding metal does not seem to return into its intimate contact with the metal of the laminated core subsequent to this treatment when it is quickly quenched, as by a spray of water, immediately after the inductive heating. In addition, the clay wash seems to provide an additional insulating film and to facilitate the improvements which can be obtained by the induction heating and quenching steps in the method of making these dynamoelectric machine members. Any thin liquid insulating material or wash of other inert material may be substituted for the clay wash to provide the desired thin insulating film. However, it has been found that the clay wash is a cheap and effective material for this purpose.

Our improved method of making dynamoelectric machine members with cast windings therein lends itself to a very efficient production system in which the equipment for making the dynamoelectric machine member may be preset for any desired size machine and may be automatically controlled in its operation to assure substantially uniform results by providing for the uniform treatment of all finished members. As shown more clearly in Fig. 2, the dynamoelectric machine member with the cast winding therein after being finished to the desired dimension is placed in an article heating space within an induction heating coil which may be formed by a plurality of rings 6 which are electrically connected to terminal members 7 and 8, to which electric current is supplied by suitable conductors 9 and 10. The terminals 7 and 8 and the induction heating coil rings 6 are formed hollow and are adapted to be cooled by the circulation of water therethrough which, in the illustrated arrangement, may be supplied to the terminal 7 by a suitable conduit 11 and exhausted from the terminal 8 by another suitable conduit 12. This water passes from the terminal 7 into the hollow coil rings 6 and circulates through these rings and is exhausted into the terminal 8, from which it is drained by the conduit 12, thus maintaining the induction coil members 6 relatively near ambient temperature.

The dynamoelectric machine member shown in Fig. 2 is inserted into the space within the induction coil members 6, and the electric current is turned on for the predetermined length of time, thereby inducing a very intense heat in the dynamoelectric machine member and particularly in the low resistance winding portion of this member. After this heat treatment, the electric current is cut off from the induction coil and the dynamoelectric machine member is subjected to a quick quenching which may comprise a water spray automatically turned on by an electromagnetically controlled valve 13 which connects a water supply conduit 14 to a quenching spray ring 15. This spray ring is placed slightly above the induction coil member 6 and is formed with a plurality of spray openings 16 in the lower inner periphery thereof adapted to spray quenching water downwardly and inwardly over the dynamoelectric machine member within the article heating space of the induction coil member 6. Other quenching material, such as oil, may be used if desired; however, water has been found to provide a very satisfactory quenching agent for this step in the operation. In order to improve the efficiency of the equipment, it has been found desirable to make the quenching fluid supply ring member 15 of some nonmetallic material, such as plastic, thereby preventing the induction of heating current in the quenching ring and also minimizing stress which might be placed on this ring due to magnetic effects thereon if it were made of metal.

Any suitable means for controlling the sequence of operation of our improved method may be utilized. However, it has been found that this equipment provides the desired results when it is used to induce the intense heat in the member which is being treated by a very high frequency in the induction coil and by a definite amount of heating in this member for a substantially predetermined time together with a subsequent quick quenching of the treated member as soon as possible after the heating step is completed. In Fig. 3, we have shown a system for carrying out these features of our invention in which the induction coil members 6 are adapted to be connected through a set of circuit breaker contacts 17 to a suitable high frequency generator 18 which preferably supplies alternating current to the induction coil members 6 at about 9600 cycles. This alternating current generator may be driven by an suitable substantially constant speed motor 19 and is provided with a field exciting winding 20 adapted to be energized through a full wave rectifier 21. This rectifier may be connected across a controllable autotransformer 22 adapted to be energized by alternating current from an alternating current power supply circuit 23 through contacts 24 of a circuit breaker which is manually controlled through a switch or circuit breaker 25.

In order to operate this system, the source of electrical power supply 23 is connected to the system through suitable circuit breaker contacts 26 which energize a substantially constant speed motor 27 adapted to operate continuously when the system is connected to the source of power supply 23. Closure of the switch 25 energizes the operating coil 28 of the circuit breaker 24, thereby energizing the autotransformer 22, which in turn energizes the field exciting winding 20 of the high frequency alternator 18 and provides a source of high frequency alternating current for the operation of the induction heating coils 6. If it is desired to operate the system by manual control, a circuit breaker 29 may be closed to energize an operating coil 30 of a relay so as to close an electric circuit through contacts 31 of the relay to energize an operating coil 32 of the circuit breaker 17, thereby closing the circuit of the induction heating coil members 6 on the high frequency alternator 18 to provide the desired induction heating. After the lapse of the desired time for the induction heating, manual opening of the switch 29 will cause the de-energization of the operating coil 30 and th opening of the relay contacts 31, which deenergize the operating coil 32 of the circuit breaker 17 and results in the opening of the circuit of the induction heating coil members 6 by disconnecting these members from the high frequency alternator 18. Quenching may then be provided by manually closing the contacts of a circuit breaker 33 to connect a valve operating coil 34 across the supply line 23 to operate the quenching valve 13 and provide a supply of cooling water to the spray tube 15 from the water supply conduit 14 for cooling the dynamoelectric machine member. By manually opening the circuit breaker 33, the operating coil 34 of the valve 13 may be deenergized and the valve 13 closed, thereby shutting off the supply of quenching water from the quench ring 15 and permitting the removal of the treated dynamoelectric machine member from the induction coil.

The desired heat treatment to provide the best results may be determined experimentally and then the heat treatment system may be made to operate automatically. Automatic operation of the system may be obtained in the illustrated system by depressing a starting circuit breaker button 35 to close a circuit through a normally closed-circuit stop button 36 for energizing an operating coil 37 on an electromagnetic clutch. Energization of the clutch coil 37 provides for the engagement of the clutch 38 and the transmission of power from the constantly operating motor 27 to a drive shaft 39 for automatically providing a desired time sequence of the heating and quenching operations. This shaft 39 may operate any suitable time delay or sequence relays and is shown connected to three operating cams 40, 41, and 42, schematically illustrated as having constant operating surfaces. However, in equipment which is adapted to treat various sizes of dynamoelectric machine members, these cams preferably would be formed with adjustable operating surfaces in order to vary the time of operation during the which the dynamoelectric machine is subjected to the heat treatment and the time during which the quenching takes place in accordance with the size and material of the treated members. Engagement of the clutch 38 provides for the rotation of the shaft 39 and of the three cams 40, 41, and 42. The cam 40 is adapted to rotate, as indicated by an arrow thereon, and provide for the closure of electric contacts 43 which provide a holding circuit around the start button 35 for the period of time indicated by the raised portion of the cam 40. Further rotation of the shaft 39 causes the cam 41 to operate a set of contacts 44 to close a circuit across the source of electric power supply 23 through the relay operating coil 30 to close a circuit through the contacts 31 of the relay, thereby energizing the operating coil 32 of the circuit breaker 17 and closing the circuit breaker 17, which energizes the high frequency induction coil members 6 by the high frequency alternator 18. The high frequency is supplied to the induction coils 6 by the alternator as long as the contacts 44 are held closed by the operating cam 41 for a predeterminable time. When the raised portion of the operating cam 41 rotates to such a position that the contacts 44 are opened, the cam 42 will have turned to a position so as to close a set of contacts 45 which complete a circuit across the source of electrical power supply 23 through operating coil 34 of the valve 13, thereby operating the valve to its open position and providing a supply of quenching water to the quenching ring 15. This provides for the subsequent quick subjecting of the heated dynamoelectric machine member to water quenching which continues until the cam 42 has rotated to a position in which the contacts 45 are again opened, thereby deenergizing the operating coil 34 of the valve 13 and shutting off the supply of quenching water, thus controlling the flow of quenching fluid to the ring 15 for a predeterminable time dependent on the cam operation. Further rotation of the shaft 39 causes the cam 40 to turn to a position in which the contacts 43 are opened, thereby deenergizing the electromagnetic clutch operating coil 37 and declutching the shaft 39 from the operating motor 27. This provides a complete cycle, after which the treated dynamoelectric machine member may be removed from its position within the induction coil members 6 and a new member may be inserted, after which another cycle of heat treatment can be automatically provided by again depressing the start button 35.

If for any reason it is desired to control manually the automatic operation and thereby eliminate the automatic starting and stopping of the sequence of operation, this may be obtained by closing a manually controllable circuit breaker 46 which will keep the electromagnetic clutch operating coil 37 continuously energized until its circuit is manually broken by the circuit breaker 46 or by depression of the stop button 36. The automatic operation of the system may be stopped at any time by depressing the stop button 36 which opens the circuit of the electromagnetic operating clutch coil 37, thereby preventing further rotation of the shaft 39 and effectively stopping automatic operation of the system. This depression of the stop button 36, however, does not permanently disconnect the automatic sequence of operation, but only stops this sequence for such time as the button 36 is depressed. Various automatic timing devices may readily be substituted for those schematically illustrated in Fig. 3 to provide the desired adjustable features which may be provided by adjustable cam surfaces in a system such as that illustrated, and, if desired, the entire system may be simply manually controlled without the use of any automatic control whatsoever. Similarly, the system may be made completely automatic without any provision for manual control if it is considered desirable not to have the control of the heat treatment steps variable by the operator of the equipment.

While we have illustrated and described a particular embodiment of our invention, modifications thereof will occur to those skilled in the art. We desire it to be understood, therefore, that our invention is not to be limited to the particular arrangements disclosed, and we intend in the appended claims to cover all modifications which do not depart from the spirit and scope of our invention.

What we claim as new and desire to secure by Letters Patent of the United States is:

1. A dynamoelectric machine member comprising a laminated core of magnetic material having a plurality of axially extending winding slots therein, a clay wash applied to the surface of said core, and a cast winding including conductors in said winding slots, said winding and core members being machined together to form a common outer periphery, said member being subjected to very intense heat somewhat below the melting point of the cast winding for a few seconds and subsequently quickly cooled by quenching.

2. A dynamoelectric machine member comprising a laminated core of magnetic material having a plurality of axially extending winding slots therein, and a cast winding including conductors in said winding slots and electrically conductive members connecting together said conductors, said cast winding and core members being subjected after assembly to finishing one surface of said core and one surface of said cast winding by a single machining operation and then subjected to very intense heat for a brief time and subsequently quickly cooled by quenching.

3. A dynamoelectric machine member comprising a laminated core of magnetic material having a plurality of axially extending winding slots therein, and a cast in situ winding including conductors in said winding slots and electrically conductive members comprising end rings electrically connecting together said conductors, said cast winding and core members being subjected after assembly and finishing to very intense heat for a brief time and subsequently quickly cooled by water quenching, so that the bond is effectively broken between said cast winding and said core.

4. A dynamoelectric machine member comprising a laminated core of magnetic material having a plurality of axially extending winding slots therein, a clay wash applied to the surfaces of said winding slots, and a cast winding including conductors in said winding slots and end ring members electrically connecting together said conductors, said cast winding and core members being machined to a common dimension and then subjected to very intense heat somewhat below the melting point of the cast winding for a few seconds and subsequently quickly cooled by quenching.

5. The method of making a dynamoelectric machine member comprising forming a laminated core by assembling a plurality of laminations having a plurality of open winding slots in an edge thereof, casting a winding having a different coefficient of thermal expansion than that of said core in the slots of the laminated core, finishing the outer periphery of said core and cast winding to the desired dimensions, heating the member to a temperature slightly below the melting point of the cast winding for a short time, and then quickly cooling the member to about ambient temperature.

6. The method of making a dynamoelectric machine member comprising forming a laminated core by assembling a plurality of circular laminations having a plurality of winding slots in an edge thereof, casting winding having a different coefficient of thermal expansion than that of said core conductors having a different coefficient of thermal expansion than that of said core in the slots of the laminated core, finishing the member core and winding to the desired outer periphery dimension, inductively heating the member by high frequency to a temperature slightly below the melting point of the cast winding at substantially 9600 cycles for a few seconds, and then quickly subjecting the member to a quenching to about ambient temperature.

AUBREY A. BRITAIN.
ROBERT L. STRODE, Jr.

REFERENCES CITED

The following references are of record in the file of this patent:

UNITED STATES PATENTS

| Number | Name | Date |
|---|---|---|
| 1,190,937 | Moore | July 11, 1916 |
| 1,924,311 | Frey | Aug. 29, 1933 |
| 1,925,052 | Larsh | Aug. 29, 1933 |
| 2,003,587 | Fahlman | June 4, 1935 |
| 2,012,021 | Peterson | Aug. 20, 1935 |
| 2,022,192 | Ferree | Nov. 26, 1935 |
| 2,139,748 | Harrell | Dec. 13, 1938 |
| 2,266,552 | Jones | Dec. 16, 1941 |
| 2,304,067 | Anderson | Dec. 8, 1942 |
| 2,315,508 | Deneen et al. | Apr. 6, 1943 |
| 2,318,095 | Putman | May 4, 1943 |
| 2,376,613 | Nelson | May 22, 1945 |
| 2,392,802 | Anderson | Jan. 15, 1946 |
| 2,406,310 | Agule | Aug. 27, 1946 |

FOREIGN PATENTS

| Number | Country | Date |
|---|---|---|
| 704,085 | Germany | Mar. 22, 1941 |

Certificate of Correction

Patent No. 2,509,720　　　　　　　　　　　　　　　　　　　May 30, 1950

AUBREY A. BRITAIN ET AL.

It is hereby certified that error appears in the printed specification of the above numbered patent requiring correction as follows:

Column 6, line 7, strike out the word "the" after "during"; column 8, lines 29, 30, and 31, strike out "having a different coefficient of thermal expansion than that of said core";

and that the said Letters Patent should be read as corrected above, so that the same may conform to the record of the case in the Patent Office.

Signed and sealed this 31st day of October, A. D. 1950.

[SEAL]

THOMAS F. MURPHY,
*Assistant Commissioner of Patents.*